United States Patent [19]

Preradovich

[11] Patent Number: 4,473,248

[45] Date of Patent: Sep. 25, 1984

[54] WEED PICKER

[76] Inventor: Rudy Preradovich, 191 Cadillac Ave., Val D'Or, Quebec, Canada, J9 2J7

[21] Appl. No.: 425,530

[22] Filed: Sep. 28, 1982

[30] Foreign Application Priority Data

Dec. 14, 1981 [CA] Canada ................................ 392201

[51] Int. Cl.³ .............................................. A01B 1/18
[52] U.S. Cl. ................................................. 294/50.8
[58] Field of Search ................... 294/50.8, 50.6, 19 R, 294/50.9, 20, 99, 33, 21, 100, 116, 117, 53.5, 115, 49

[56] References Cited

U.S. PATENT DOCUMENTS

| | | | |
|---|---|---|---|
| 652,077 | 6/1900 | Burson | 294/50.8 |
| 774,142 | 11/1904 | Brick | 294/50.8 |
| 2,358,632 | 11/1943 | Gerken | |
| 2,703,251 | 9/1951 | Green | |
| 2,957,722 | 5/1959 | Ferraro | |
| 3,617,084 | 5/1969 | Mares | |

Primary Examiner—James B. Marbert
Attorney, Agent, or Firm—Prutzman, Kalb, Chilton & Alix

[57] ABSTRACT

A device for extracting or pulling weeds or the like from the ground is described. The device comprises an elongated stem including an inner shaft located within a hollow outer shaft, an operating means at the upper end of the stem and a pair of cooperating opposed scooping blades at the lower end of the stem. Each of the upper portions of the blades is pivotally connected via a linkage mechanism to the inner shaft and each of the center portions of the blades is pivotally connected to the outer shaft. Spring means maintains, in cooperation with the inner shaft, the lower portions of the blades in a spaced apart open position. In order to grip a root, the blades are brought into the closed position by effecting via the operating means movement of the inner shaft relative to the outer shaft against the biasing force of the spring.

11 Claims, 3 Drawing Figures

WEED PICKER

The present invention relates to a device for extracting or pulling weeds and the like from the ground. In particular, this invention relates to a device for removing deep roots such as the tap roots of dandelions or the like from lawns and other cultivated areas.

In the past a variety of approaches have been taken to achieve the extraction of weeds from the soil. Most of the known devices, however, are not completely satisfactory with regard to properties such as handling properties, effectiveness in removing the roots of weeds, reliability of operation, ease of cleaning, etc. Representative of known devices of this kind are the extractors disclosed in Canadian Pat. No. 247,195 to Moore and Canadian Pat. No. 345,880 to Dragovich.

The weed picker according to the present invention comprises a stem, an operating means at one end, the upper end, of the stem and a pair of cooperating scooping blades at the lower end of the stem. The stem comprises a hollow outer shaft and an inner shaft. The inner shaft extends within the outer shaft and is movable in axial direction relative to the outer shaft. Each of the upper portions of the blades is in pivotal association via a linkage mechanism with the inner shaft, and each of the center portions of the blades is in pivotal association with the outer shaft. A spring means resiliently urges the inner shaft in upward direction such that the linking members, which are pivotally connected to the inner shaft, in turn, urge the upper portions of the blades upwardly. This causes the center portions of the blades to pivot relative to the outer shaft into a position in which the lower gripping portions of the blades are spaced from each other. In this way the action of the spring means retains the blades in an open position and ready to be used.

The operator of the weed picker according to the invention can actuate the operating means to impart movement in axial direction to the inner shaft against the action of the spring means. Such downwardly directed movement pushes the linking members downwardly, thereby forcing the upper portions of the blades outwardly away from the stem so that the blades pivot about their center portion into a position in which the lower gripping portions of the blades approach each other. In certain embodiments of the invention the edges of the lower portions of the blades may actually meet.

In use, the weed picker according to the invention is in its open position placed over a weed. Pressure is exerted on the device in downward direction so that the edges of the lower portions of the blades cut and penetrate the ground on either side of the weed which is to be extracted. Following that, the operating means is acutated to close the blades and grip the roots of the weed. The weed may then be extracted by pulling the device upwardly out of the ground. On release of the operating means the spring action returns the blades into the open position. The extracted weed and soil can be dropped and the weed picker is ready for use again.

Accordingly, the present invention provides a device adapted for pulling weeds and the like which comprises a stem, a pair of blades, spring means and operating means. The elongated stem includes an outer hollow shaft and an inner shaft extending within and being movable relative to the outer shaft in the lengthwise direction. The pair of opposed elongated blades are located at one end of the stem. An upper portion of each blade is pivotally connected via a linkage mechanism to the inner shaft and a center portion of each blade is pivotally connected to the outer shaft. The pivotal connections and the linkage mechanisms are so arranged that the blades are caused to move between open and closed positions relative to each other in response to relative movement between the inner and outer shafts. The spring means biases, in cooperation with the inner shaft, the lower portions of the blades toward the spaced apart open position. The manually actuated operating means are connected to the end of the stem which is remote from the blades for effecting the movement of the inner shaft relative to the outer shaft against the biasing force of the spring means for closing the blades, whereby, in use, the lower portions of the blades are brought into gripping relation with an object positioned therebetween.

The present invention will now be described in more detail with reference to the accompanying drawings which illustrate, by way of example, a preferred embodiment of the invention and in which.

Figure 1:
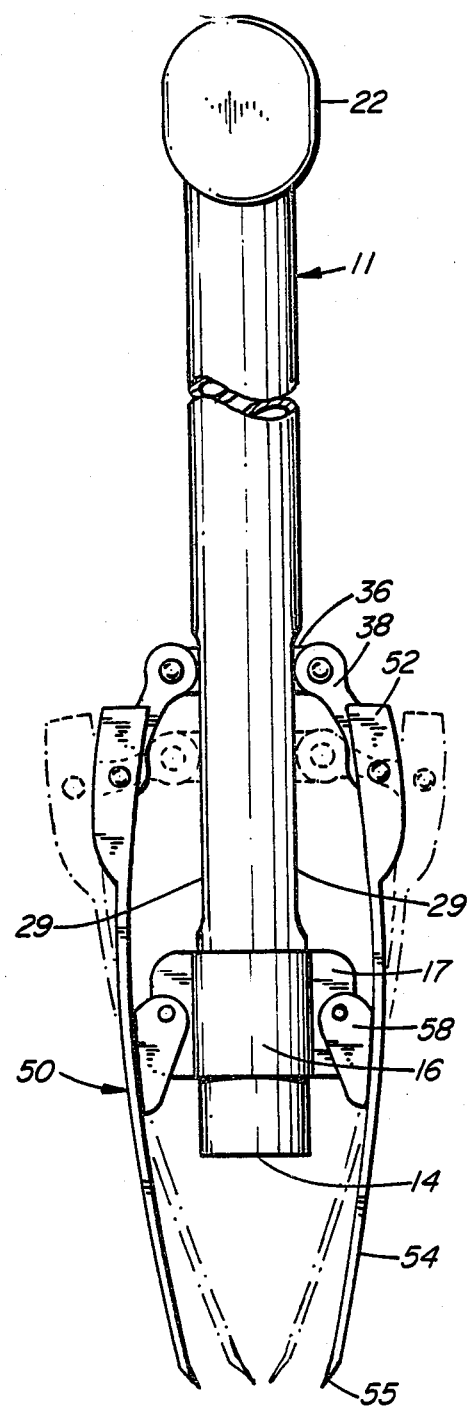
FIG. 1 is a fragmentary front elevation of a preferred embodiment of the invention.
Figure 3:
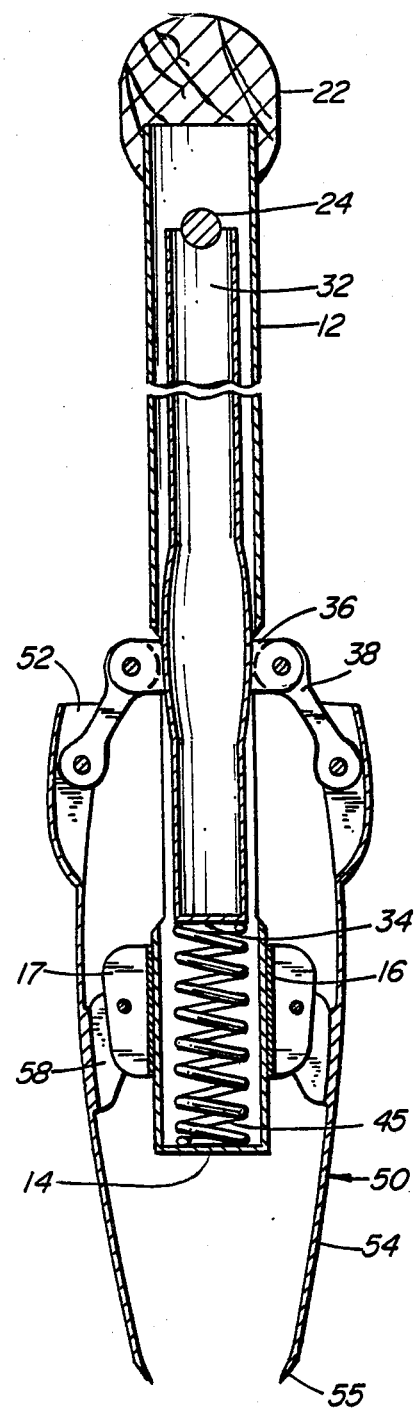
FIG. 3 is a fragmentary longitudinal section along line III—III in FIG. 2.
Figure 2:
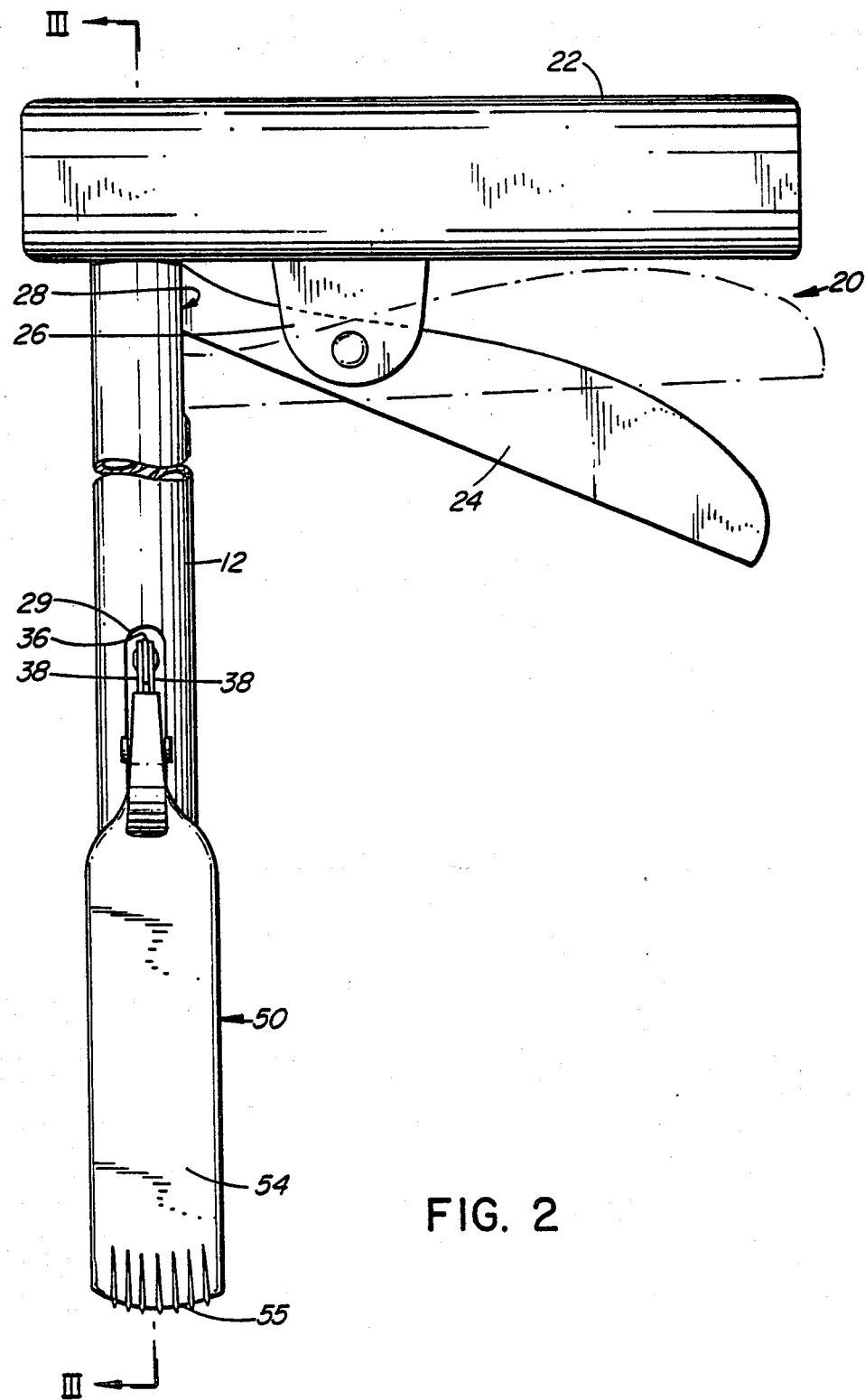
FIG. 2 is a fragmentary side elevation of the embodiment illustrated in FIG. 1.

Referring to FIGS. 1 to 3 the weed picker comprises a tubular stem 11, an operating means 20 located at one end of the stem (which will be referred to as the upper or top end of the weed picker) and a pair of scooping blades or spoons 50 located at the opposite end of the stem (which will be referred to as the lower end of the weed picker). The stem includes a hollow outer shaft 12 and an inner shaft 32 extending coaxially within the outer shaft. The operating means consists of an elongated lever 24 the center portion of which is connected to a handle 22 via an extension 26 and is pivotable about the extension 26. The handle 22 is fixedly secured to the top end of the outer shaft. One end of the lever is associated with the top end of the inner shaft 32. To this effect the lever passes through a slot-shaped opening 28 in the outer shaft. The other or outward end of the lever is adapted to be gripped by the operator of the weed picker. Both the handle and the lever can be gripped with one hand.

A collar 16 is attached to the outside of the outer shaft at its lower end. The collar has two wing-shaped extensions 17 extending at 180° to each other. Above each of these extensions 17 the outer shaft is provided with two elongated openings 29. Near the bottom of the inner shaft two connecting arms 36 are integrally attached to the inner shaft and extend outwardly from the shaft at 180° to each other. These connecting arms protrude through openings 29.

Blades 50 are disposed opposite of each other. Each of the upper portions 52 of blades 50 is connected to and pivotable about the outer end of the flat elongated linking member 38. The inner end of each linking member 38, in turn, is connected to and pivotable about one of the two connecting arms 36. A connecting link 58 is attached to the center portion of each blade. Each connecting link 58 is connected to and pivotable about one of the wing-shaped extensions 17.

The outer shaft is closed at its bottom end by plate 14. A spring 45 is disposed within the outer shaft and is resting on plate 14. The opposite, upper, end of the coil spring 45 is associated with the bottom 34 of the inner shaft biasing the inner shaft into the position shown in FIG. 3. In this position of the inner shaft the lever 24 is in its resting position as shown in FIG. 2 and the blades are in the open position as shown in FIGS. 1 and 3.

The blades have a narrow upper portion 52 and wide centre and lower portions so as to be adapted for holding roots of weeds. The bottom edges 55 of the blades may be fluted or grooved to facilitate penetration of the ground.

In order to extract a weed the operator grips the device by the handle 22, places the bottom edges 55 in the open position over the weeds and forces the lower portion of the blades into the ground, one blade on each side of the weed. The operator then grips the handle 22 and lever 24 together in one hand and pivots the lever about extension 26 by pushing the outward end of the lever towards the handle into the position shown in broken lines in FIG. 2. This causes the opposite end of the lever to move downwardly along slot 28, thereby pressing the inner shaft and the attached connecting arms 36 downwardly against the action of the spring 45. Consequently, the inner end of linking member 38 is moved in downward direction thereby pushing the upper portions of the blades outwardly. This causes the blades to pivot about wing-shaped extensions 17 until their lower portions reach the closed position shown in broken lines in FIG. 1. This closing of the blades causes the root of the weed to be gripped by the edges of the blades or by soil compressed between the blades. The weed picker may then be slightly rocked back and forth to loosen most of the roots. Following this the device is withdrawn from the soil in upward direction with the blades in closed position so as to extract the weed with all or at least most of its roots. In this way weeds such as dandelions may efficiently and easily be removed from cultivated areas such as lawns or flower beds with little or no disturbance of any surrounding plants and without appreciable marring of the area.

The foregoing disclosure has described one preferred embodiment of the invention. Some alternatives have been suggested. It is intended within the spirit of the invention to include all of such changes and modifications which would be apparent to those knowledgeable in the art and which fall within the scope of the claims below.

I claim:

1. A device adapted for pulling weeds and the like comprising:
    (a) a elongated stem including an outer hollow shaft and an inner shaft extending within and being movable relative to the outer shaft in the lengthwise direction;
    (b) a pair of opposed elongated blades at one end of said stem, an upper portion of each blade being pivotally connected via a linkage mechanism to the inner shaft and a center portion of each blade being pivotally connected to the outer shaft with said pivotal connections and said linkage mechanisms being so arranged that said blades are caused to move between open and closed positions relative to each other in response to relative movement between said inner and outer shafts;
    (c) spring means located within the outer shaft and biasing, in cooperation with the inner shaft, the lower portions of the blades toward the spaced apart open position; and
    (d) manually actuated operating means for effecting the movement of the inner shaft relative to the outer shaft against the biasing force of the spring means for closing the blades, whereby, in use, to bring said lower portions of the blades into gripping relation with an object positioned therebetween, said operating means including lever means connected to the inner shaft at the end which is remote from the blades and projecting through a slot-like opening in the outer shaft laterally outwardly from the stem, said lever means cooperating with handle means which is fixedly secured to the outer shaft, and said lever means being pivotally connected to the handle means for movement between resting and operating positions.

2. A device as in claim 1 wherein each linkage mechanism comprises a connecting arm fixedly attached to the inner shaft and protruding through an elongated opening in the outer shaft, and a linking member one end of which is pivotally connected to said connecting arm and the other end of which is pivotally connected to the upper portion of one of the blades.

3. A device as in claim 2 wherein movement of the inner shaft relative to the outer shaft in direction towards the blades and against the biasing force of the spring means causes the linking member to push the upper portions of the two blades outwardly away from the stem, thereby causing the blades to pivot about their center portions so that the lower portions of the blades approach each other.

4. A device as in claim 1 wherein the lower end of the inner shaft rests on the spring means.

5. A device as in claims 2, 3, or 4 wherein the center portion of each blade pivots about a wing-shaped extension which is fixedly attached to the outer shaft.

6. A device as in claim 1 wherein the lever and handle means are adapted to be gripped simultaneously with one hand and wherein the lever, when moved out of its resting position, effects the movement of the inner shaft relative to the outer shaft against the biasing force of the spring means so that the lower portions of the blades approach each other.

7. A device as in claim 3 wherein the lower end of the inner shaft rests on the spring means.

8. A device as in claim 4 wherein the lever and handle means are adapted to be gripped simultaneously with one hand and wherein the lever, when moved out of its resting position, effects the movement of the inner shaft relative to the outer shaft against the biasing force of the spring means so that the lower portions of the blades approach each other.

9. A device as in claim 8 wherein the bottom edges of said blades are fluted so as to facilitate penetration of the ground.

10. A device as in claim 9 wherein said blades are shaped such that, when pressure is exerted on said handle means to push the blades into the ground, the lower portions of the blades are caused to approach each other, thereby causing the inner shaft to move against the biasing force of the spring means and pivoting the lever means out of its resting position.

11. The device of claim 1 wherein said handle means has a fulcrum with said lever means being pivotally connected to said fulcrum to provide a mechanical advantage to the free end of the lever means.

* * * * *